Patented Sept. 29, 1931

1,824,995

UNITED STATES PATENT OFFICE

EDWARD W. HILL, OF CHICAGO, ILLINOIS, ASSIGNOR TO A. B. DICK COMPANY, OF CHICAGO, ILLINOIS, A CORPORATION OF ILLINOIS

INK

No Drawing.   Application filed May 1, 1923. Serial No. 635,978.

The object of this invention is to provide an ink which, while capable of other uses, shall be particularly adaptable for use upon fast printing stencil-duplicating machines such as the rotary mimeograph and the like. For such use or uses the ink herein disclosed possesses certain important advantages, among which are that it will not dry or cake upon pads or rollers, it will dry or set quickly upon the impression sheet, it will produce excellent prints through all of the various types of stencils now in common use, it may be easily and cheaply compounded and as easily and cheaply modified with respect to color or, in adapting it to different types of machines, with respect to consistency.

In carrying out the invention I employ, preferably as the major constituent, rosin oil, adding to this a (preferably) smaller quantity of a sulphonated oil such as Turkey red oil and a (preferably) still smaller quantity of a hydro-carbon oil such as paraffin oil. To the mixture so constituted, I add a substantial quantity of water and a suitable quantity of dye or pigment to produce the desired color. The quantity of water employed may be varied according to the strength or grade (quantity of fatty matter content) of the Turkey red oil. In fact, all of the ingredients may be varied substantially without noticeable detriment to the resulting mixture. Excellent results may be obtained by employing a formula having approximately the following proportions, i. e.,—

Parts by weight

| | |
|---|---|
| 120 | rosin oil. |
| 90 | Turkey red oil. |
| 10 | paraffin oil. |
| 60 | water. |
| 17 | carbon |

These ingredients, when combined, should be ground in an ordinary ink mill, as is customary in this art. For some uses I have found it desirable to add to the compound a sulphonated mineral oil such as that now on the market under the trade name "Superba Soluble Oil". This may also be employed as a reducer, being combined with the compound either by stirring therein or by being ground therewith. The term Turkey red oil in the claims covers, of course, known equivalents thereof.

What I claim is:—

1. An ink for stencil-duplicating machines, comprising rosin oil, Turkey red oil, paraffin oil, water and coloring matter, a greater percentage of rosin oil being present than Turkey red oil and a greater percentage of Turkey red oil being present than paraffin oil.

2. An ink for stencil duplicating machines comprising relatively large quantities each of rosin oil and Turkey red oil, the two combined constituting about two-thirds of the ink, a quantity of paraffin oil equivalent to about five percent of said combined oils, water and coloring matter.

This specification signed this 28th day of April, 1923.

EDWARD W. HILL.